(12) United States Patent
Chelaidite et al.

(10) Patent No.: US 12,145,551 B2
(45) Date of Patent: Nov. 19, 2024

(54) ACTUATOR ASSEMBLY FOR A VEHICLE BRAKE AND METHOD FOR ACTIVATING AN ACTUATOR ASSEMBLY FOR A VEHICLE BRAKE

(71) Applicants: ZF Active Safety US Inc., Livonia, MI (US); ZF Active Safety GmbH, Koblenz (DE)

(72) Inventors: Galus Chelaidite, South Lyon, MI (US); Volker Knop, Ulmen (DE); Nicholas Alford, Waldesch (DE); Christoph Beuerle, Koblenz (DE); Werner Seibert, Kammerforst (DE); Markus Mallmann, Pfalzfeld (DE)

(73) Assignees: ZF Active Safety GmbH, Koblenz (DE); ZF Active Safety US Inc., Livonia, MI (US)

( * ) Notice: Subject to any disclaimer, the term of this patent is extended or adjusted under 35 U.S.C. 154(b) by 436 days.

(21) Appl. No.: 17/528,257

(22) Filed: Nov. 17, 2021

(65) Prior Publication Data

US 2023/0150467 A1    May 18, 2023

(51) Int. Cl.
   *B60T 13/74* (2006.01)
   *B60T 1/06* (2006.01)
   (Continued)

(52) U.S. Cl.
   CPC ............ *B60T 13/746* (2013.01); *B60T 1/065* (2013.01); *F16D 65/18* (2013.01);
   (Continued)

(58) Field of Classification Search
   CPC .... F16D 2127/06; F16D 63/006; F16D 65/18; F16D 2121/24; F16D 2125/40;
   (Continued)

(56) References Cited

U.S. PATENT DOCUMENTS

| 6,349,801 B1* | 2/2002 | Koth ................. F16D 65/18 188/72.8 |
| 2005/0145448 A1* | 7/2005 | Watanabe ............ F16D 55/226 188/73.1 |

(Continued)

FOREIGN PATENT DOCUMENTS

| DE | 10233673 A1 | 3/2003 |
| DE | 102011102860 A1 | 12/2012 |

(Continued)

OTHER PUBLICATIONS

German Search Report, mailing date Jul. 14, 2023. English translation not provided.

*Primary Examiner* — Christopher P Schwartz
(74) *Attorney, Agent, or Firm* — Kristin L. Murphy

(57) ABSTRACT

An actuator assembly for a vehicle brake is described. It comprises a carrier assembly (22) on which an activating carriage (88) for a brake lining is guided linearly. Moreover, an electric motor fastened to the carrier assembly (22) is provided which is coupled drivingly to the activating carriage via a gear unit and a spindle drive such that the activating carriage can be displaced selectively between a retracted position and an extended position. In addition, the actuator assembly comprises a locking assembly (106) for selectively immobilizing in rotation an output shaft (38) of the electric motor. The locking assembly (106) here comprises a locking lever (114) which at a first end (116) is mounted rotatably on the carrier assembly (22) and at a second opposite end (118) is coupled to a locking actuator (112). A locking tooth (124) is moreover positioned between the first end (116) and the second end (118). A method for activating an actuator assembly for a vehicle brake is furthermore presented.

13 Claims, 5 Drawing Sheets

(51) Int. Cl.
*F16D 65/18* (2006.01)
*F16D 121/24* (2012.01)
*F16D 125/40* (2012.01)
*F16D 125/50* (2012.01)

(52) U.S. Cl.
CPC ...... *F16D 2121/24* (2013.01); *F16D 2125/40* (2013.01); *F16D 2125/50* (2013.01)

(58) Field of Classification Search
CPC ...... F16D 2125/50; B60T 1/005; B60T 1/065; B60T 13/746; F16H 63/3416
USPC ............................................. 188/72.8
See application file for complete search history.

(56) References Cited

U.S. PATENT DOCUMENTS

| | | | | |
|---|---|---|---|---|
| 2005/0217952 | A1* | 10/2005 | Usui | F16D 65/18 188/162 |
| 2005/0258683 | A1* | 11/2005 | Yamaguchi | F16D 65/18 188/162 |
| 2007/0114843 | A1* | 5/2007 | Kawahara | B60T 13/74 303/122 |
| 2008/0127772 | A1* | 6/2008 | Sauter | F16H 63/3425 74/575 |
| 2010/0051395 | A1* | 3/2010 | Sano | B60T 13/741 188/162 |
| 2012/0241263 | A1* | 9/2012 | Stover | F16D 65/28 188/156 |
| 2017/0114848 | A1* | 4/2017 | Park | B60T 13/741 |
| 2017/0321772 | A1* | 11/2017 | Lee | F16D 65/18 |
| 2018/0135710 | A1* | 5/2018 | Sala | B60T 13/741 |
| 2019/0107196 | A1* | 4/2019 | Banshoya | F16H 63/3433 |
| 2022/0307562 | A1* | 9/2022 | Yoshizu | F16D 65/183 |

FOREIGN PATENT DOCUMENTS

| | | |
|---|---|---|
| DE | 112020002046 T5 | 1/2022 |
| EP | 1058795 B1 | 9/2003 |

* cited by examiner

ACTUATOR ASSEMBLY FOR A VEHICLE BRAKE AND METHOD FOR ACTIVATING AN ACTUATOR ASSEMBLY FOR A VEHICLE BRAKE

TECHNICAL FIELD

The invention relates to an actuator assembly for a vehicle brake, having a carrier assembly on which an activating carriage for a brake lining is guided linearly, an electric motor fastened to the carrier assembly and which is coupled drivingly to the activating carriage via a gear unit and a spindle drive such that the activating carriage can be displaced selectively between a retracted position and an extended position, and a locking assembly for selectively immobilizing in rotation an output shaft of the electric motor.

BACKGROUND

The invention moreover concerns a method for activating an actuator assembly for a vehicle brake.

Such actuator assemblies are known from the prior art. They are also referred to as electromechanical actuator assemblies. The locking assembly is here usually used to perform the function of a parking brake. In this connection, the activating carriage is first transferred into its extended position. The output shaft of the electric motor is then immobilized by means of the locking assembly. The activating carriage is thus fixed in the extended position.

In this connection, an activating carriage should be understood to mean a component which is mounted so that it can move essentially linearly and which is designed to move another component, in this case a brake lining of the vehicle brake. With reference to the vehicle brake, the extended position of the activating carriage is thus associated with activation of the vehicle brake. The retracted position of the activating carriage is accordingly associated with an unactivated state of the vehicle brake.

In this connection, the vehicle brake is configured, for example, as a disc brake.

SUMMARY

It is furthermore known that actuator assemblies for vehicle brakes must be installed in very narrow structural spaces.

Against this background, the object of the invention is to improve an actuator assembly of the type mentioned at the beginning. It is in particular intended to produce a compact actuator assembly.

The object is achieved by an actuator assembly of the type mentioned at the beginning, in which the locking assembly comprises a locking lever which at a first end is mounted rotatably on the carrier assembly and at a second opposite end is coupled to a locking actuator, wherein a locking tooth, which can be selectively brought into engagement with a locking contour provided on the output shaft, is positioned in the direction in which the locking lever extends longitudinally between the first end and the second end. This configuration ensures a compact structure of the actuator assembly such that the latter can be easily integrated into a relatively small structural space on a vehicle. Such an actuator assembly is additionally reliable when in operation.

The gear unit of the actuator assembly can here comprise a gear train and/or a planetary gear stage. The planetary gear stage is preferably arranged behind the gear train in a flow of power from the electric motor to the spindle drive. In this way, drive power from the electric motor can be reliably geared down.

The locking actuator is preferably a linear actuator. It engages, for example, on an opening at the second end of the locking lever which can be configured as a slot. The locking lever can thus be reliably activated.

According to an embodiment, the locking contour is formed by a toothing of an output gear wheel coupled fixedly to the output shaft. In this way, the output shaft can be effectively prevented from rotating. Furthermore, an output gear wheel of this type can also be used as an input element for the gear unit. The output gear wheel therefore performs two functions such that there is no need to provide a separate locking contour. A simpler and more compact structure of the actuator assembly thus results.

The gear unit, the spindle drive and associated drive couplings are preferably configured so that they are not self-locking. This means that the activating carriage can be relocated by the application of an axial force when in an operating situation in which it is not driven by means of the electric motor. As a result, when the actuator assembly is in operation, the activating carriage does not need to be actively withdrawn from its extended position. Instead, it is also possible with such a configuration that the activating carriage is, owing to elasticities inherent in the system, shifted from its extended position in the direction of the retracted position, as long as the electric motor is not activated. A vehicle brake equipped with an actuator assembly of this type is therefore open at all times when it is not activated, i.e. in particular even if the supply of current has failed. The actuator assembly and the vehicle brake equipped therewith thus always assume a defined state.

An axis of rotation of the output shaft can also be arranged essentially parallel to a centre axis of the spindle drive. A compact structure of the actuator assembly results.

In an alternative, the first end of the locking lever is fork-shaped and receives a bearing bolt fastened to the carrier assembly in order to rotatably mount the locking lever. In this connection, fork-shaped means that the receiving space for the bearing bolt is open on one side. The bearing bolt is therefore enclosed 180° by the first end. As a result, the locking lever can be mounted relatively quickly and simply inside the actuator assembly.

The locking actuator can comprise a solenoid. The solenoid can here preferably be turned on electrically. The locking lever can thus be activated simply and reliably.

The locking actuator can here be bistable. This means that the locking actuator is held in two positions without any current. These are thus preferably a retracted position and an extended position. They are further preferably associated with a locking position and a release position of the locking assembly. The locking position can here also be referred to as the locking state, and the release position as the release state. The locking assembly can thus be operated in a reliable and energy-efficient fashion.

In the event that the locking actuator is a solenoid, the latter can be configured to be bistable such that two permanent magnets, integrated into the solenoid, are each designed to hold the armature of the solenoid in the retracted position and the extended position. It is also conceivable to equip the solenoid with mechanical fixing devices which are likewise designed to hold the armature of the solenoid in the retracted position and the extended position.

According to an alternative embodiment, a supporting contour for supporting a force component acting essentially radially with respect to the rotatable mounting of the locking lever is provided between the first end and the second end in the direction in which the locking lever extends longitudinally, wherein the supporting contour interacts with a bearing contour provided on the carrier assembly. Such a supporting contour and an associated bearing contour are, in particular in combination with a locking lever which has a fork-shaped end, advantageous. No tensile forces can namely be transmitted from the locking lever to the bearing bolt at such a fork-shaped end. Forces of this type are consequently supported by means of the supporting contour and the bearing contour and result, for example, in the locked state from a torque present at the output shaft of the electric motor. The supporting contour and the bearing contour thus cause the output shaft to be reliably prevented from rotating.

The supporting contour and/or the bearing contour can here comprise a cylindrical surface portion of a circular cylinder, the centre axis of which coincides with an axis of rotation associated with the rotatable mounting of the locking lever. Such a design of the supporting contour and/or the bearing contour ensures reliable support of forces acting radially with respect to the bearing bolt. At the same time, the locking lever possesses the required degree of freedom of movement. In the event that both the supporting contour and the bearing contour comprise cylindrical surface portions, the forces acting radially with respect to the bearing bolt are supported over a large area and reliably.

In an embodiment, the supporting contour is formed on a flank of a supporting projection. The supporting projection can here have a toothed design. Moreover, the supporting projection is preferably arranged on a side of the locking lever opposite the locking tooth. More preferably, the supporting projection is provided as an integral part of the locking lever. Overall, the supporting contour can in this way be provided in a simple and cost-effective manner. At the same time, it functions with a high degree of reliability.

The bearing contour can be formed on an arc-shaped wall section of the carrier assembly. Such a wall section can be produced simply and cost-effectively. Furthermore, forces supported by means of the bearing contour can in this way be reliably transmitted into the carrier assembly.

According to an alternative embodiment, the locking lever has two sections in the direction in which it extends longitudinally, the sections being offset relative to each other in a direction which corresponds to the direction in which the output shaft extends longitudinally. The locking lever can also be described as cranked. A locking lever of this type can be integrated easily into narrow and cramped structural spaces. It is in particular thus possible that the locking lever, on the one hand, interacts with an output gear wheel on the output shaft of the electric motor and, on the other hand, leaves a large enough structural space for the gear unit which must be coupled drivingly likewise with the output shaft. As a result, at least one section of the locking lever can advantageously be positioned behind the gear unit in a direction corresponding to the direction in which the output shaft extends longitudinally.

The object is additionally achieved by a method of the type mentioned at the beginning, wherein the actuator assembly comprises an electric motor which is coupled drivingly, via a gear unit and a spindle drive, to an activating carriage for a brake lining such that the activating carriage can be displaced selectively between a retracted position and an extended position. A locking assembly which can be activated by a locking actuator is moreover provided for selectively immobilizing in rotation an output shaft of the electric motor. Thus, in order to activate a parking brake mode, the activating carriage is transferred into the extended position by means of the electric motor, and the locking assembly is then transferred into a locking state by means of the locking actuator whilst the activating carriage is held in the extended position by means of the electric motor.

Alternatively, in order to deactivate the parking brake mode, the electric motor is operated in a direction associated with the extended position of the activating carriage and/or the locking actuator is operated in a direction associated with the release state.

When the parking brake mode is activated, the supply of current to the electric motor is therefore not stopped until the locking assembly has securely reached the locking state. In the event that the locking actuator has a bistable design, supply of current to it can then also be stopped. The parking brake mode can consequently be activated with a high degree of reliability. There are several alternatives for deactivating the parking brake mode. In a preferred alternative, the electric motor is first operated in a direction associated with the extended position of the activating carriage. As a result, the force on the locking lever is relaxed. The locking actuator is then operated in a direction associated with the release state such that the locking lever, in particular the locking tooth, is removed from the locking contour. However, it is of course also possible just to operate the locking actuator in a direction associated with the release state in order to deactivate the parking brake mode. In this alternative embodiment too, the parking brake mode is reliably deactivated. However, the locking lever may here be shifted under load. In a second alternative embodiment, just the electric motor is operated in a direction associated with the extended position of the activating carriage in order to deactivate the parking brake mode. In this way, the locking lever is forced into its release position via the locking tooth. The locking actuator thus snaps over by virtue of the application of an external force.

The actuator assembly is further preferably configured so that they are not self-locking such that an associated vehicle brake is released by virtue of elasticities inherent in the system as soon as the locking assembly is in the release state and the electric motor is not activated.

The actuator assembly used in the method according to the invention is in particular an actuator assembly according to the invention.

When the parking brake mode is deactivated, the electric motor can be operated after the locking assembly has been moved in a direction associated with the retracted position of the activating carriage. In this alternative embodiment, the activating carriage is therefore transferred actively into its retracted position by means of the electric motor. A vehicle brake associated with the actuator assembly is consequently opened with a high degree of reliability.

It is moreover possible that the locking assembly assumes a release state in a service brake mode. The locking assembly is therefore not used in a service brake mode in which the actuator assembly serves to perform the function of a service brake. In other words, the locking lever is held constantly in the release position and just the electric motor is used to activate the vehicle brake.

BRIEF DESCRIPTION OF THE DRAWINGS

The invention is explained below with the aid of an exemplary embodiment which is shown in the attached drawings, in which.

DESCRIPTION

Figure 1:
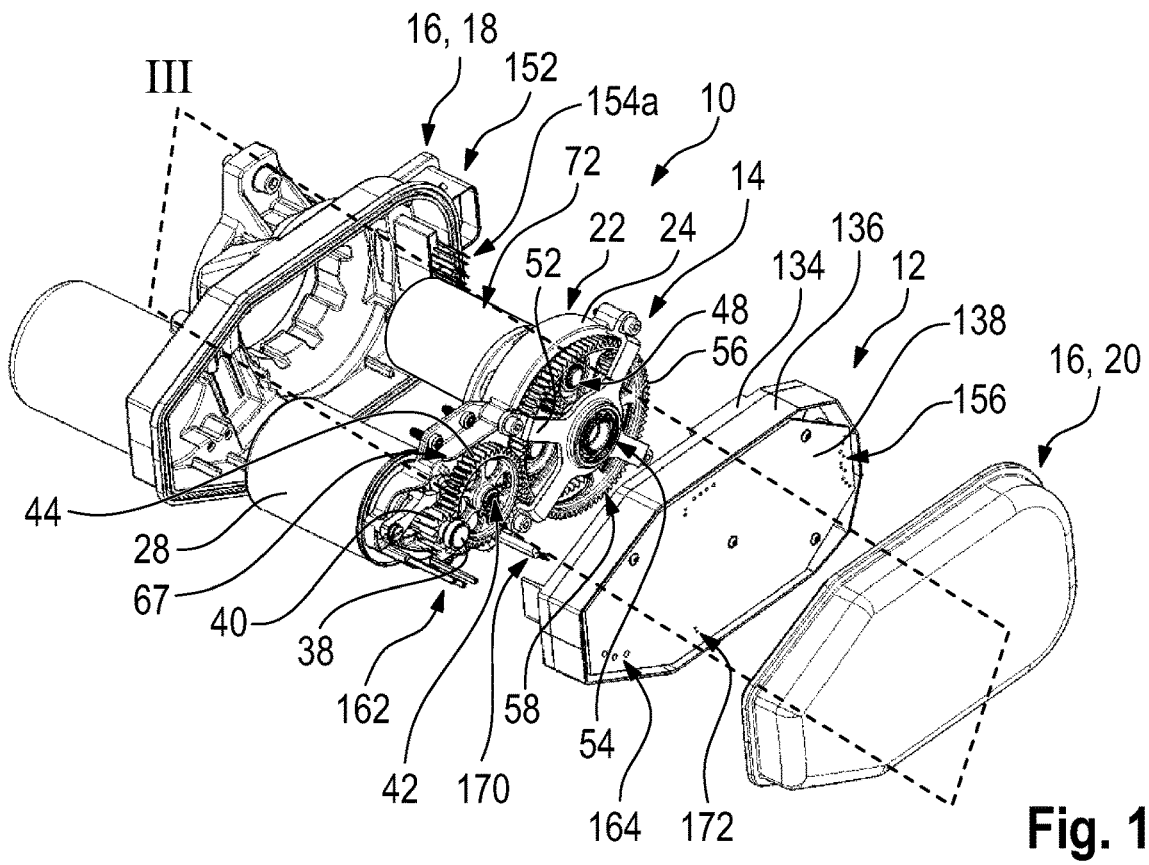
FIG. 1 shows an actuator assembly according to the invention which can be operated by means of a method according to the invention in a perspective exploded view.

FIG. 1 shows an actuator assembly 10 for a vehicle brake.

The actuator assembly 10 comprises a control assembly 12 which can be mounted as a separate subunit, and a drive assembly 14 which can be mounted as a separate subunit.

The control assembly 12 and the drive assembly 14 are arranged in a common housing 16.

The housing 16 comprises an essentially shell-shaped housing base part 18 and a housing cover 20 by means of which the housing base part 18 is closed leaktightly in the mounted state.

In the embodiment illustrated, the housing cover 20 is also essentially shell-shaped.

Both the housing base part 18 and the housing cover 20 are produced from a plastic material. The housing 16 as a whole is thus made from plastic material.

The drive assembly 14 can be seen in detail in FIGS. 2 to 6.

Figure 2:
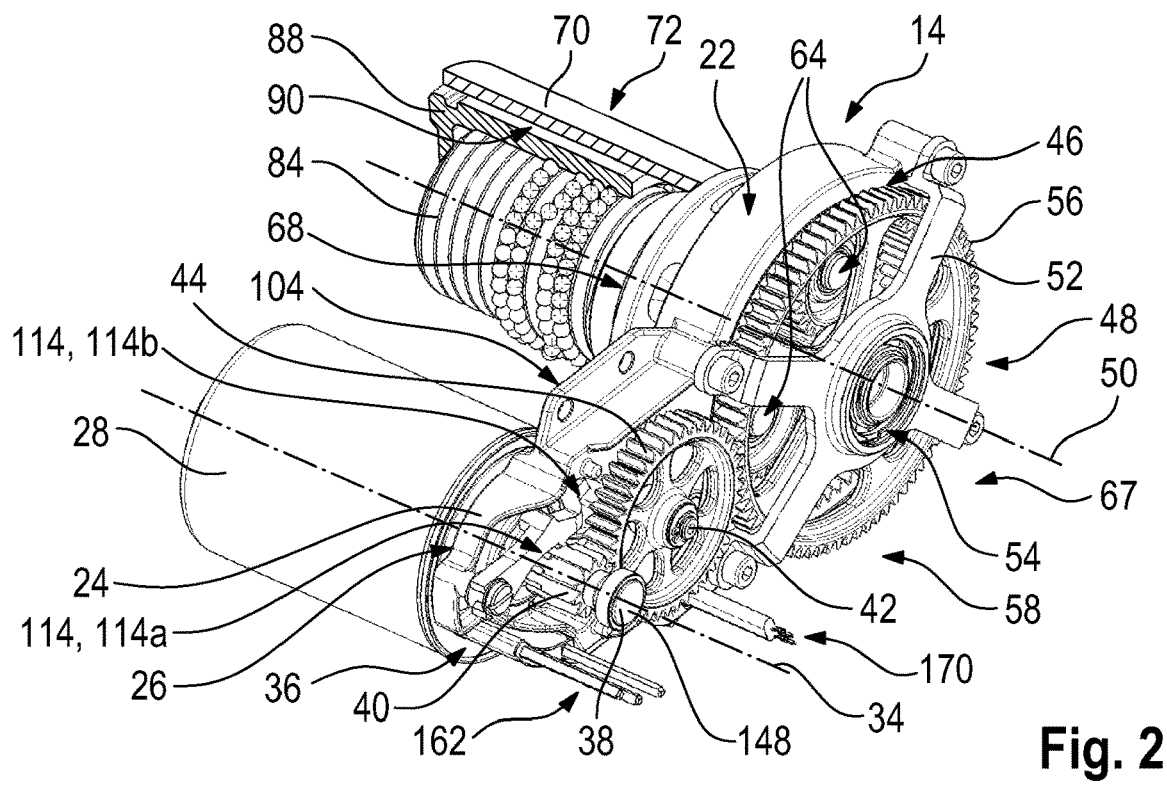
FIG. 2 shows a drive assembly of the actuator assembly from FIG. 1 in an isolated, partially cut-away view.
Figure 5:
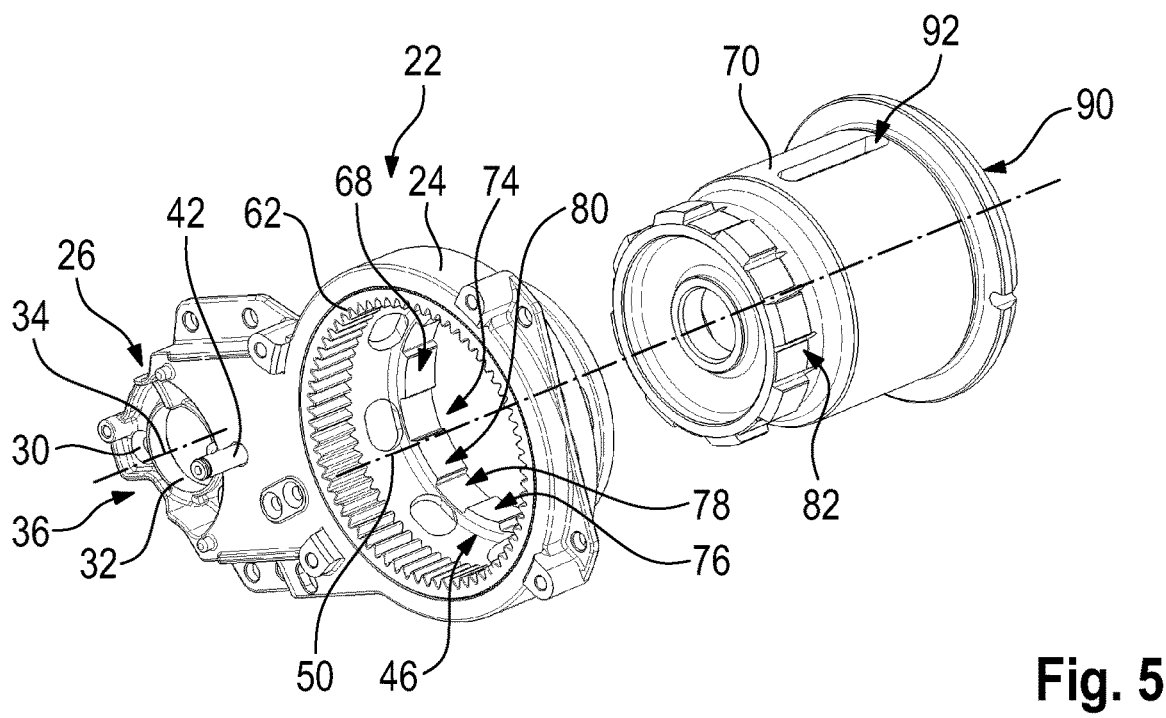
FIG. 5 shows a carrier assembly of the drive assembly from FIG. 2 in a perspective exploded view.

The drive assembly 14 comprises a carrier assembly 22 which has a plate-like frame part 24 (see in particular FIGS. 2 and 5).

A first fastening interface 26, on which an electric motor is fastened in the exemplary embodiment illustrated, is provided on the plate-like frame part 24.

To be more precise, the electric motor 28 is connected captively to the frame part 24 via the first fastening interface 26. For this purpose, a bore 30 via which the electric motor 28 can be fastened on the frame part 24 by means of a screw is provided on the frame part 24 (see FIGS. 4 and 5).

A centring device 32 in the form of a centring surface is furthermore arranged on the frame part 24. The electric motor 28 can therefore be fastened on the frame part 24 so that it is centred with respect to a centre axis 34 of the first fastening interface 26.

In addition, an anti-rotation device 36 in the form of an anti-rotation depression is provided which is designed so as to prevent the electric motor 28 from rotating relative to the frame part 24.

An output gear wheel 40 is arranged on an output shaft 38 of the electric motor 28 in order to impart torque to the drive assembly 14.

Furthermore, a bearing pin 42, on which, in the embodiment illustrated, a gear wheel 44 is mounted which meshes with the output gear wheel 40, is provided on the frame part 24.

A receiving space 46 for a planetary gear stage 48 is provided on the frame part 24. In the embodiment illustrated, the receiving space 46 is essentially bell-shaped (see in particular FIG. 5).

A centre axis 50 of the receiving space 46 is here arranged essentially parallel to the centre axis 34 of the first fastening interface 26.

A reinforcing part 52 is moreover fastened on the frame part 24 in such a way that it spans the receiving space 46 at an axial end with respect to the centre axis 50.

In the embodiment illustrated, the reinforcing part 52 is essentially cross-shaped.

In addition, a bearing point 54 for a gear wheel 56 arranged coaxially with respect to the planetary gear stage 48 is provided on the reinforcing part 52.

The gear wheel 56 meshes with the gear wheel 44.

A gear train 58, the input element of which is embodied by the output gear wheel 40, is consequently formed by the gear wheel 44 and the gear wheel 56.

The gear wheel 56 is moreover formed integrally with a sun wheel 60 of the planetary gear stage 48. In this way, the gear train 58 and the planetary gear stage 48 are coupled drivingly.

The planetary gear stage 48 moreover comprises a ring gear 62 which runs essentially along an inner periphery of the receiving space 46 (see in particular FIG. 5).

In the embodiment illustrated, a total of three planetary gears 64 are provided drivingly between the sun wheel 60 and the ring gear 62. They are mounted rotatably on a planet carrier 66.

The planet carrier 66 here represents an output element of the planetary gear stage 48.

The gear train 58 and the planetary gear stage 48 are also together referred to a gear unit 67.

The frame part 24 furthermore has a second fastening interface 68 which is designed to fasten a bearing sleeve 70 for a spindle drive 72.

A centre axis of the second fastening interface 68 here coincides with the centre axis 50 of the receiving space 46 and for this reason is provided with the same reference numeral.

The second fastening interface 68 has an anti-rotation geometry 74, which is formed by a plurality of radial projections 76 and radial depressions 78 arranged alternately around the periphery, running peripherally around the centre axis 50. For the sake of greater clarity, only one exemplary radial projection 76 and one exemplary radial depression 78 are in each case provided with a reference numeral in FIGS. 5 and 6.

The radial projections 76 and the radial depressions 78 are provided with a constant spacing. This means that the radial depressions 78 are each of the same length peripherally. The radial projections 76 are also each of the same length peripherally. A radial height of the radial projections 76 is furthermore constant.

In this way, an anti-rotation device 80 of the second fastening interface 68 is formed.

A complementary geometry 82 is provided at the end of the bearing sleeve 70 which is to be coupled to the second fastening interface 68 such that the bearing sleeve 70 can be pushed along the centre axis 50 into the anti-rotation geometry 74 of the second fastening interface 68 and held there, fixed in rotation.

The spindle drive 72 is received inside the bearing sleeve 70.

It comprises a spindle 84 which in the present case is configured as a ball screw (see in particular FIG. 2).

The spindle 84 is here connected to the planet carrier 66 via the toothed section 86 so that it is fixed in rotation.

The spindle drive 72 can thus be driven by means of the electric motor 28. In detail, the electric motor 28 is coupled drivingly to the spindle drive 72 via the gear train 58 and the planetary gear stage 48.

A spindle nut 88 with a piston-like design is mounted on the spindle 84. Rotation of the spindle 84 here causes the spindle nut 88 to be shifted axially along the centre axis 50.

The spindle nut 88 is here guided on the bearing sleeve 70 along the centre axis 50 by a linear guide geometry 90. The linear guide geometry 90 corresponds essentially to a cylindrical surface forming the inner periphery of the bearing sleeve 70.

The spindle nut 88 is moreover prevented from relative rotation about the centre axis 50 by means of an anti-rotation device 92 which is formed as a slot on the bearing sleeve 70. For this purpose, a radial protrusion 94, which engages in the slot, is attached to the spindle nut 88 (see FIG. 3).

Figure 3:
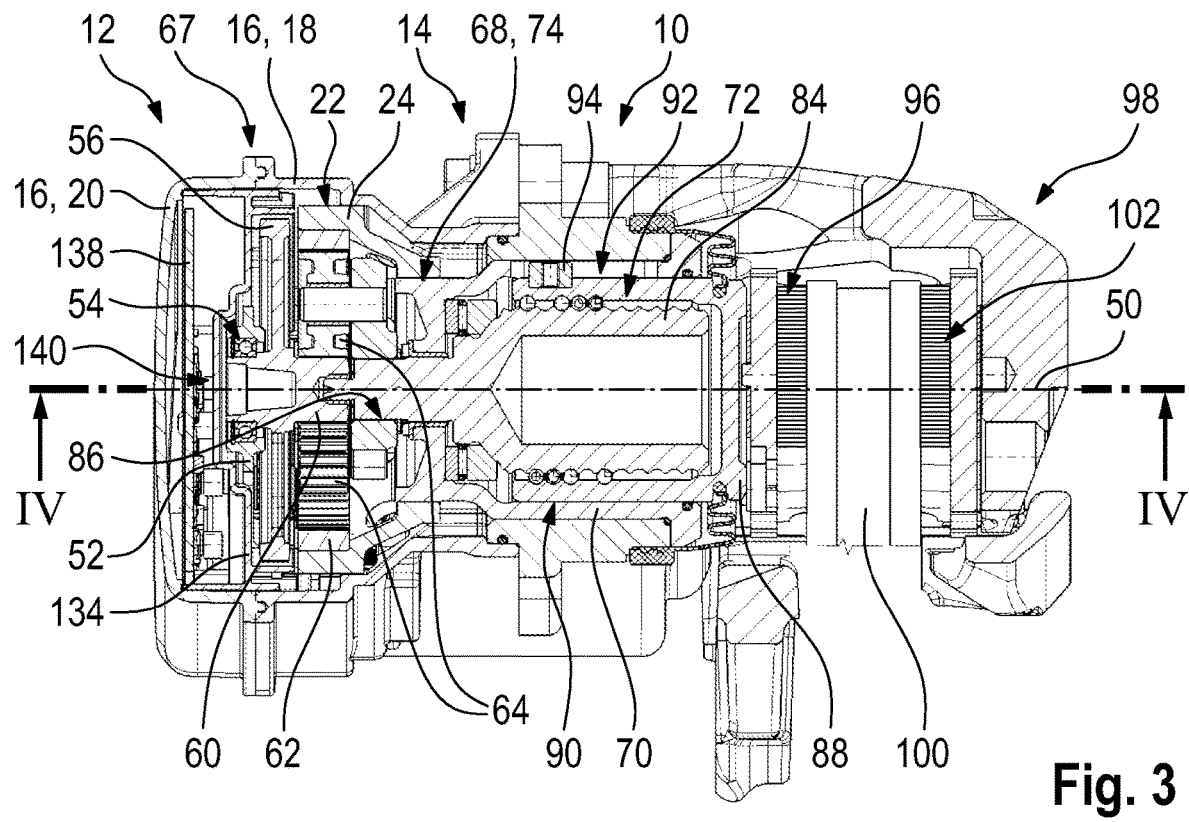
FIG. 3 shows the actuator assembly from FIG. 1 in a view in section in the plane III in FIG. 1, wherein a brake caliper assembly is attached to the actuator assembly.

The spindle nut 88 furthermore serves as an activating carriage for a first brake lining 96 of a brake caliper assembly 98 (see FIG. 3). Because the spindle nut 88 and the activating carriage are formed by the same component, they have been provided with the same reference numeral.

The first brake lining 96 can thus be moved by means of the actuator assembly 10 onto a brake rotor 100 which takes the form of a brake disc in the embodiment illustrated.

In detail, the activating carriage 88 is transferred selectively into an extended position which is associated with the application of the first brake lining 96 to the brake rotor 100 by means of the electric motor 28 via the gear train 58, the planetary gear stage 48 and the spindle drive 72.

A second brake lining 102 is also applied to the brake rotor 100 by virtue of the reaction forces acting within the actuator assembly 10 and the brake caliper assembly 98 (see also FIG. 3).

It should be understood that the activating carriage 88 can in the same way be displaced into a retracted position which is associated with lifting the first brake lining 96 and the second brake lining 102 off from the brake rotor 100 by operating the electric motor 28.

However, in the present case the actuator assembly 10 is configured so that it is not self-locking such that the activating carriage 88 is also automatically shifted back into the retracted position by virtue of the elasticities inherent in the system when it is no longer actively forced into the extended position by means of the electric motor 28.

Figure 6:
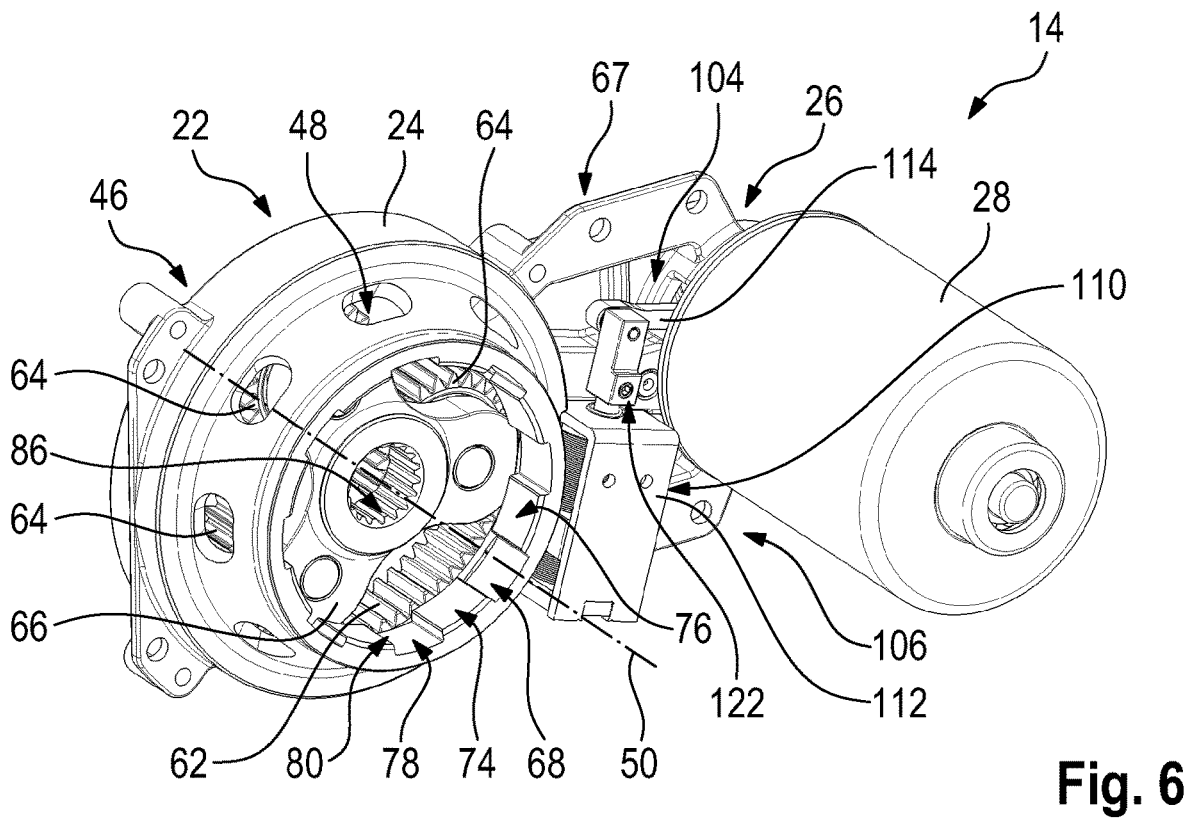
FIG. 6 shows the drive assembly from FIG. 2 in a rear view, wherein a spindle drive is not illustrated.

A third fastening interface 104 is furthermore provided on the frame part 24 (see in particular FIG. 6).

It is designed to fasten a locking assembly 106, wherein the locking assembly 106 is in turn provided to immobilize the output shaft 38 of the electric motor 28 selectively in terms of rotation.

In this connection, the third fastening interface 104 comprises a bearing bolt 108 fastened on the frame part 24 and a fastening interface 110 for a locking actuator 112.

The locking assembly 106 is equipped with a locking lever 114 which has a first fork-shaped end 116 which receives the bearing bolt 108 for rotatably mounting the locking lever 114.

The locking lever 114 is therefore rotated at its first end 116 so that it can rotate on the carrier assembly 22, to be more precise on the frame part 24.

At a second opposite end 118 of the locking lever 114, the latter is coupled to the locking actuator 112 via a slot 120.

In the embodiment illustrated, the locking actuator 112 is designed as a bistable solenoid.

Figure 7:
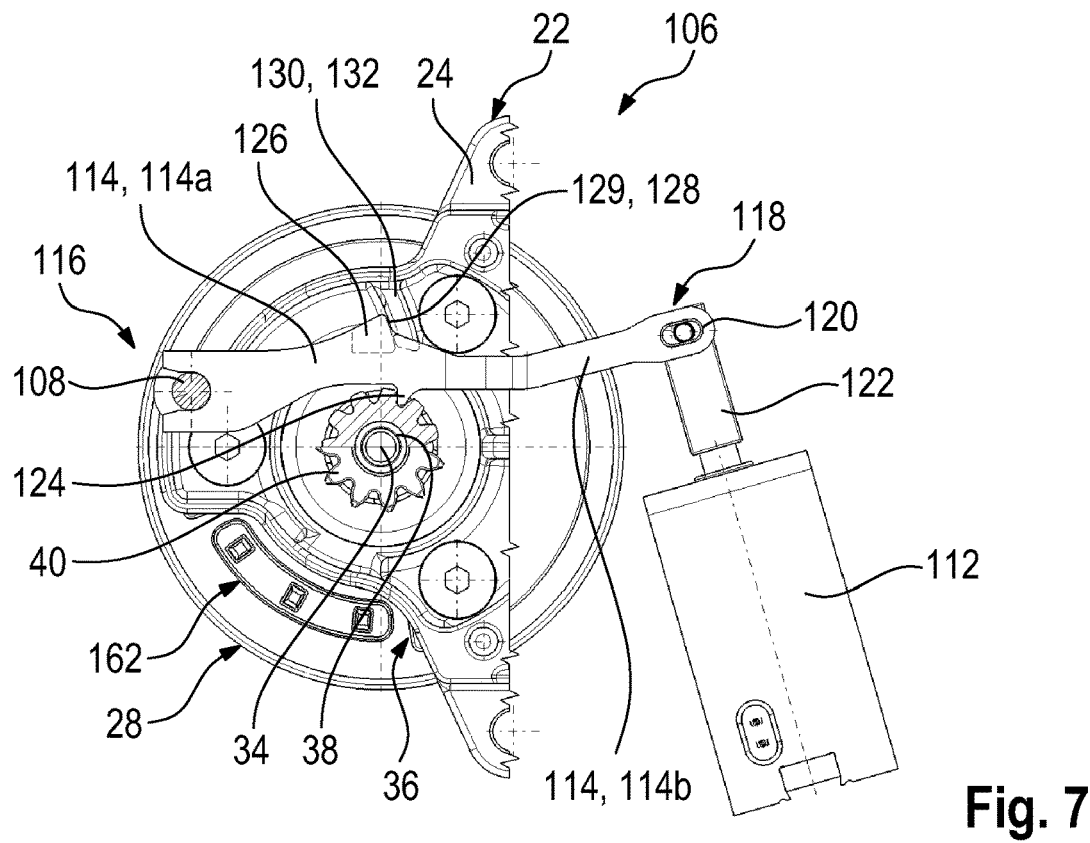
FIG. 7 shows a detailed view of a locking assembly of the actuator assembly from FIGS. 1 to 6, wherein the locking assembly assumes a locking state.
Figure 8:
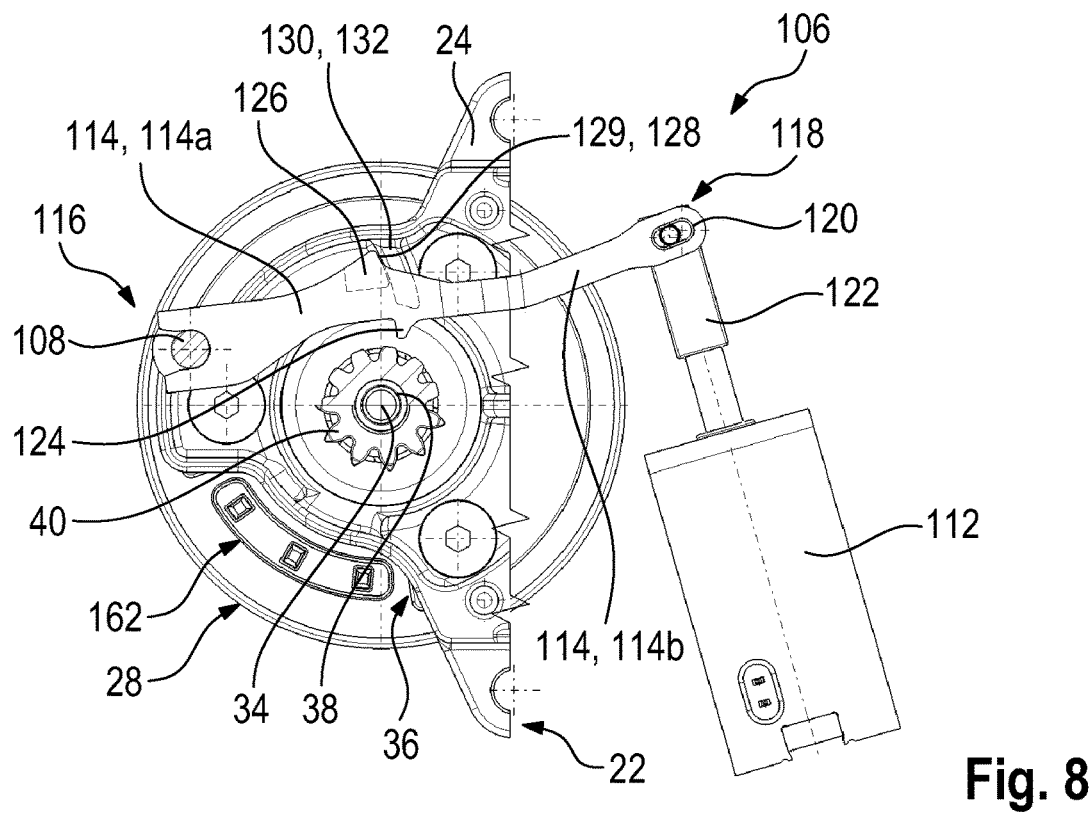
FIG. 8 shows a detailed view corresponding to FIG. 7 of the locking assembly, wherein the locking assembly assumes a release state.

This means that an armature 122 of the locking actuator 112 can be held both in its extended position and in its retracted position without any current (see FIGS. 7 and 8). The locking actuator 112 needs to be supplied with current only to shift the armature 122 between these two positions.

A locking tooth 124 is moreover positioned between the first end 116 and the second end 118 in the direction in which the locking lever 114 extends longitudinally.

It is formed integrally with the locking lever 114.

The toothing of the output gear wheel 40 additionally acts as a locking contour.

The locking tooth 124 can thus be brought into engagement with the locking contour selectively by activating the locking actuator 112.

In the event that the locking tooth 124 is thus engaged in the output gear wheel 40, the electric motor 28 is immobilized in terms of rotation (see FIG. 7). Such a position of the locking assembly 106 is also referred to as a locking position or locking state.

When the locking tooth 124 lies outside the toothing of the output gear wheel 40, the latter can be freely rotated. Such a position of the locking assembly 106 is referred to as the release position (see FIG. 8).

The locking lever 114 moreover has a support projection 126, the flank 128 of which forms a supporting contour 129, between the first end 116 and the second end 118 in the direction in which it extends longitudinally.

The support projection 126 is also formed integrally on the locking lever 114.

The flank 128 thus bears against a bearing contour 132 formed as an arc-shaped wall section 130 of the frame part 24, i.e. of the carrier assembly 22, in an essentially radial direction with respect to the bearing bolt 108.

A side face, facing the flank 128, of the arc-shaped wall section 130 here takes the form of a cylindrical surface portion of a circular cylinder, the centre axis of which coincides with a centre axis of the bearing bolt 108.

The flank 128 likewise takes the form of a cylindrical surface portion of such a circular cylinder.

The locking lever 114 is therefore supported via the supporting projection 126 and the bearing contour 132 on the frame part 24, i.e. on the carrier assembly 22, with respect to such force components which act essentially radially in terms of the rotational mounting of the latter about the bearing bolt 108.

Such force components result, in the locking state, from a torque which is present at the output gear wheel 40.

The bearing contour 132 can thus also be seen as a constituent part of the third fastening interface 104.

In order to be able to engage in the output gear wheel 40 for the purpose of immobilizing rotational movement of the electric motor 28, but at the same time not obstruct meshing of the output gear wheel 40 with the gear wheel 44, the locking lever 114 has, in the direction in which it extends longitudinally, a first section 114a which comprises the first end 116. A second section 114b comprises the second end 118.

The second section 114b is here offset along the centre axis 34 relative to the first section 114a in the direction of the electric motor 28. It is also possible to describe the locking lever 114 as having a cranked design.

It is thus possible that the second section 114b runs behind the gear wheel 44, viewed in the axial direction.

Figure 9:
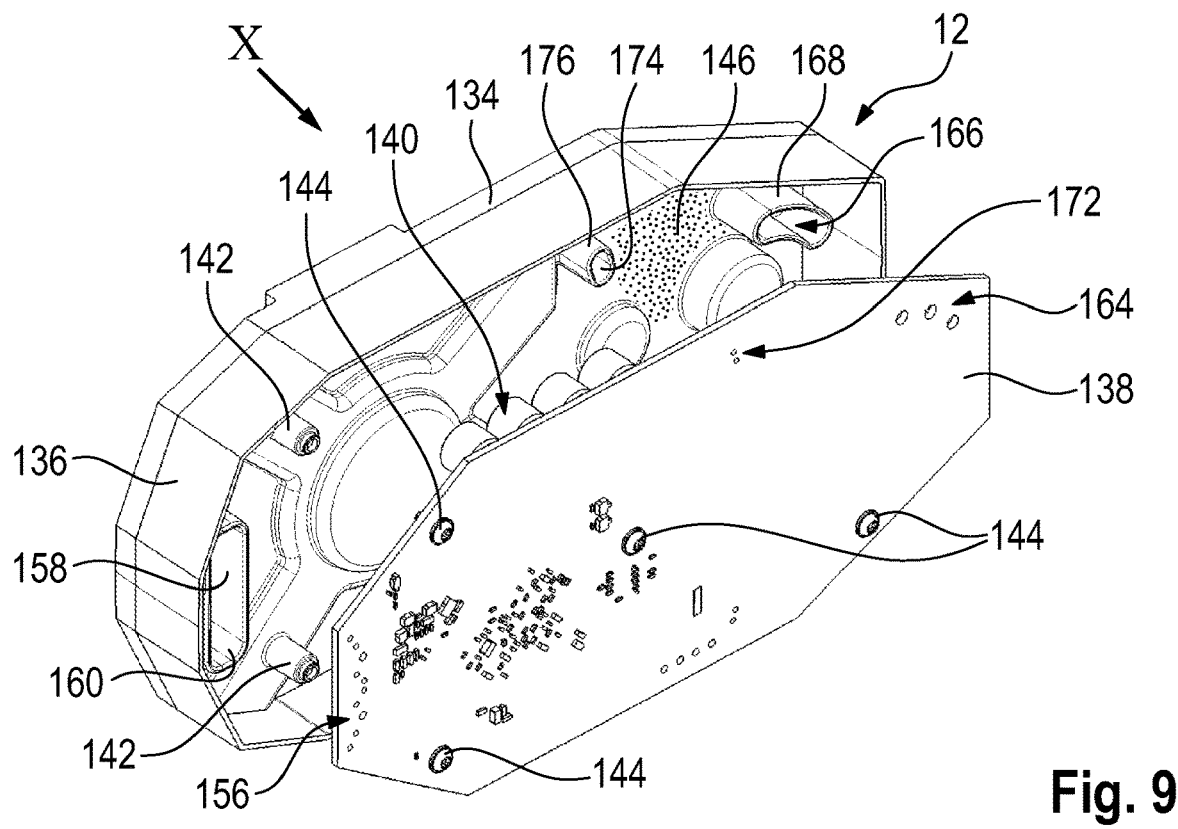
FIG. 9 shows a control assembly of the actuator assembly from FIG. 1 in a perspective exploded view.
Figure 10:
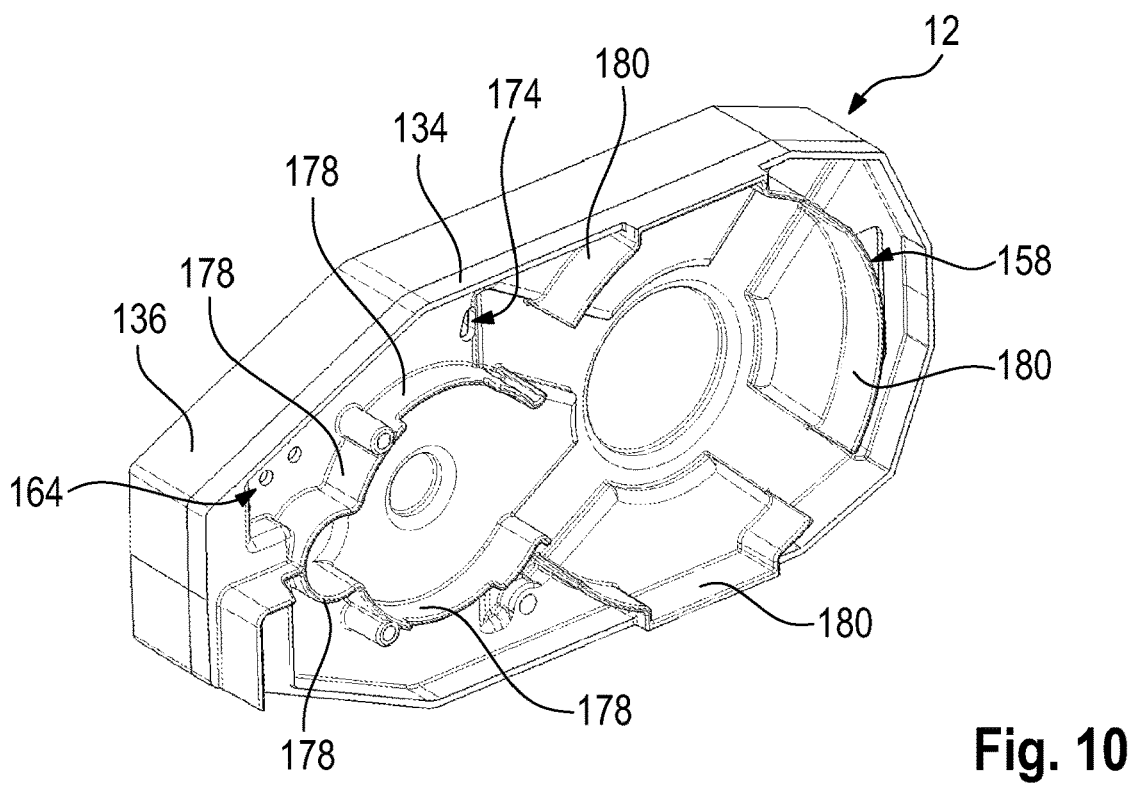
FIG. 10 shows the control assembly from FIG. 9 in a view in the direction X in FIG. 9.

FIGS. 9 and 10 show the control assembly 12 in detail.

It comprises a bulkhead wall 134 which is provided in the embodiment illustrated with a peripheral rim 136 which runs essentially completely around the outer periphery of the bulkhead wall 134.

The bulkhead wall 134 can thus also be referred to as a bulkhead tray.

The control assembly 12 moreover comprises a printed circuit board 138 on which electrical and electronic components designated as a whole by 140 are arranged and are connected to one another electrically via traces.

The electrical and electronic components 140 here form a speed-regulating unit for regulating the speed of the electric motor 28.

A current measuring unit for measuring a current received by the electric motor 28 is moreover constructed from the electrical and electronic components 140.

The electrical and electronic components 140 furthermore represent a current supply unit for supplying electrical energy to the electric motor 28. In this connection, the electrical and electronic components 140 can also be referred to as a power electronic system.

The electrical and electronic components 140 moreover form a temperature measuring unit for measuring a temperature within the actuator assembly 10.

A force measuring unit for measuring a brake actuating force supplied by means of the actuator assembly is also provided by the electrical and electronic components 140.

The electrical and electronic components 140 moreover represent a control unit for the locking assembly 106.

A rotational position detection unit for identifying a rotational position of the electric motor 28 is additionally formed from the electrical and electronic components 140 and is explained in more detail below.

In order to fasten the bulkhead wall 134 and the printed circuit board 138 against each other in a predetermined relative position, means 142 for positioning and fastening the printed circuit board 138 are provided on the bulkhead wall 134.

In the embodiment illustrated in FIG. 9, the means 142 for positioning and fastening are formed by fastening domes arranged on the bulkhead wall 134 and into which screws are screwed which extend through the printed circuit board 138.

The bulkhead wall 134 and the printed circuit board 138 are furthermore connected to each other via a sealing material 146 illustrated only schematically in an exemplary region. An intermediate space present between the bulkhead wall 134 and the printed circuit board 138 is here preferably filled essentially completely by the sealing material 146. In this way, the electrical and electronic components 140 are protected from undesired external influences, in particular from vibrations and moisture.

The bulkhead wall 134 and the printed circuit board 138 are arranged relative to the electric motor 28 such that the output shaft 38 of the electric motor 28 is oriented perpendicular to the bulkhead wall 134 and to the printed circuit board 138.

Figure 4:
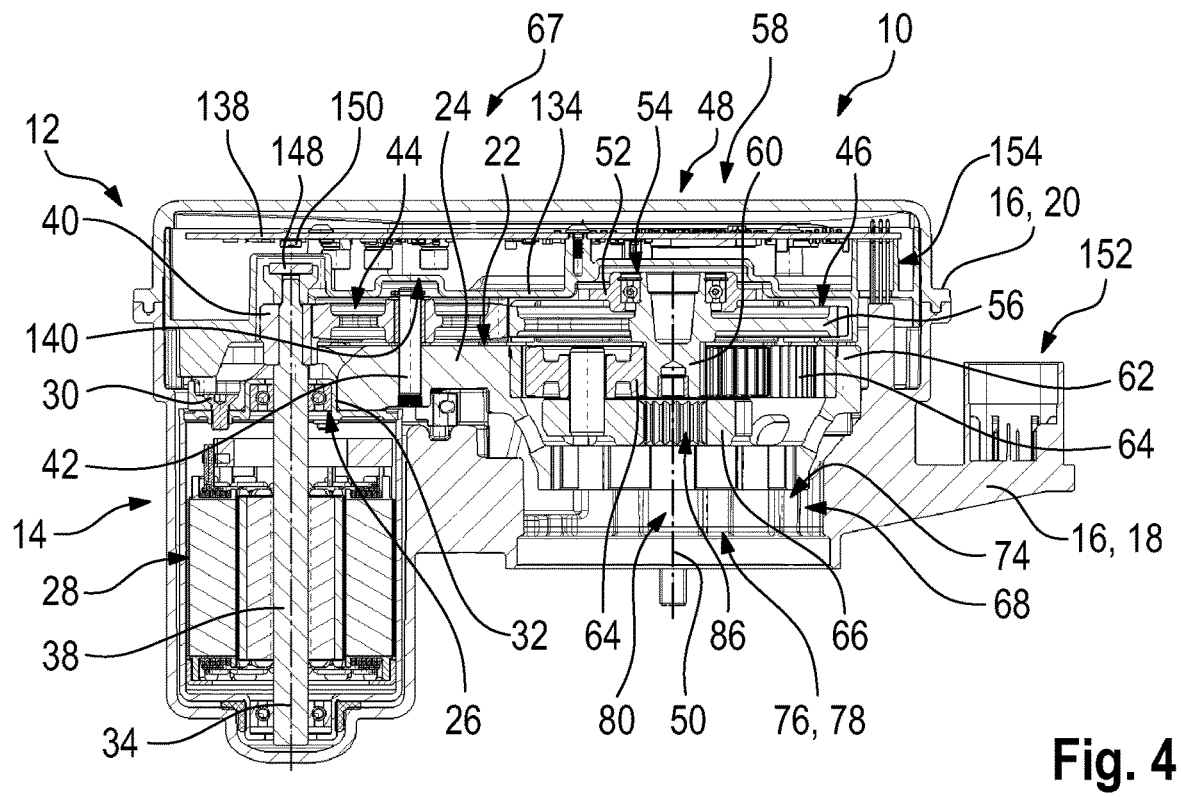
FIG. 4 shows the actuator assembly from FIG. 3 in a view along the line of section IV-IV, wherein a spindle drive of the actuator assembly is not illustrated.

A magnet 148 is here arranged at an end, facing the control assembly 12, of the output shaft 38 of the electric motor 28 (see in particular FIGS. 2 and 4).

An associated sensor 150 is positioned on the printed circuit board 138 at a location situated opposite the magnet 148 (see in particular FIG. 4).

The sensor 150 takes the form of a Hall effect sensor in the embodiment illustrated. In this way, a rotational position of the output shaft 38 of the electric motor 28 can be detected. Revolutions of the output shaft 38 can also be determined when evaluating the rotational position signals over time.

In order to supply the control assembly 12 and in particular the electrical and electronic components 140 with electrical energy, a plug connector half 152 is provided integrally on the housing 16, to be more precise on the housing base part 18 (see FIGS. 1 and 4).

The plug connector half 152 is here electrically connected to the printed circuit board 138 via a plurality of lines which are referred to collectively as a first electrical line 154.

Starting from the plug connector half 152, the first electrical line 154 runs initially inside the housing base part 18. In this connection, the first electrical line 154 can be integrated into the housing base part 18 when the latter is produced.

A section 154a, on the printed circuit board side, of the first electrical line 154 is here designed as dimensionally stable and protrudes from the housing base part 18 in a direction which is oriented essentially parallel to the centre axes 34 and 50.

Contact openings 16 associated with the first electrical line 154 are provided on the printed circuit board 138.

A passage is moreover formed on the bulkhead wall 134 such that it is ensured that the section 154a, on the printed circuit board side, reaches the printed circuit board 138 without contacting the bulkhead wall 134.

The passage 158 is additionally provided with a rim 160 such that the passage 158 is kept free of sealing material 146.

When the control assembly 12 is mounted on the housing base part 18, the first electrical line 154, to be more precise its section 154a on the printed circuit board side, is consequently plugged into the associated contact openings 156. They thus form an electrical press contact.

In the embodiment illustrated, the plug connector half 152 serves not only to supply current but also to connect the actuator assembly 10 to a bus system which is, for example, a CAN bus system.

Wheel speed sensors can moreover be connected to the actuator assembly 10 via the plug connector half 152.

The electric motor 28 is also electrically connected to the printed circuit board 138.

For this purpose, dimensionally stable contacts essentially parallel to the centre axis 34 protrude from the electric motor 28 and are referred to collectively as the second electrical line 162.

Contact openings 164 on the printed circuit board 138 are likewise associated with the second electrical line 162.

A passage 166 is moreover provided on the bulkhead wall 134, through which the second electrical line 162 can come into engagement with the contact openings 164.

The passage 166 is again equipped with a rim 168 such that it is ensured that the passage 166 is kept free of sealing material 146.

As already explained with regard to the first electrical line 154, when the control assembly 12 is mounted, the second electrical line 162 also enters the associated contact openings 164 and forms an electrical press contact.

The locking actuator 112 is electrically connected to the printed circuit board 138 via a third electrical line 170 (see FIGS. 1 and 2).

The third electrical line 170 is here also again formed from dimensionally stable contacts which protrude from the locking actuator 112 along the centre axes 34 and 50.

Contact openings 172 in the printed circuit board 138 are again associated with the third electrical line 170 (see FIG. 9).

So that the third electrical line 170 can be plugged into the contact openings 172, a passage 174 is additionally provided on the bulkhead wall 134. It is equipped with a rim 176 such that the passage 174 is also kept free of sealing material 146.

As already explained with regard to the first electrical line 154 and the second electrical line 162, the third electrical line 170 is also pushed into the associated contact openings 172 and forms an electrical press contact when the control assembly 12 is mounted.

In summary, the printed circuit board 138 is therefore coupled electrically both to the plug connector half 152 and to the electric motor 28 and the locking actuator 112.

On a side, facing the drive assembly 14, of the bulkhead wall 134, retaining ribs 178 are additionally provided in the region of the output gear wheel 40 and the gear wheel 44 which essentially form an envelope around a gear stage formed by the output gear wheel 40 and the gear wheel 44.

Retaining ribs 180 are also provided in the region of the planetary gear stage 48.

The retaining ribs 178, 180 here serve to ensure that a lubricating medium is held in the region of the gear wheels to be lubricated even when the output gear wheel 40, the gear wheel 44 and the planetary gear wheel 48 rotate.

A function of a service brake can be provided by means of the actuator assembly 10 if the actuator assembly 10 is coupled to the brake caliper assembly 98. The actuator assembly 10 is then operated in a service brake mode. The electric motor 28 is thus controlled by means of the control assembly 12 in such a way that it effects a desired shifting of the spindle nut 88, i.e. of the activating carriage 88, along the centre axis 50 via the gear train 58, the planetary gear stage 48 and the spindle drive 72.

The electric motor 28 can here in principle be activated in both directions of rotation such that the activating carriage 88 can also be shifted actively in both directions.

It is likewise conceivable to use the electric motor 28 only to displace the activating carriage 88 into an extended position, i.e. to apply the brake lining 96 to the brake motor 100.

The activating carriage 88 can be restored to a retracted position and the pressure on the brake lining 96 can therefore be relaxed in this connection by virtue of elasticities which are inherent in the system, on the one hand, and the design of the actuator assembly 10 as not self-locking, on the other hand.

In such a service brake mode, the locking assembly 106 at all times assumes the release state (see FIG. 8).

A function of a parking brake can moreover be provided by means of the actuator assembly 10.

In this connection, a parking brake mode can be activated by the spindle nut 88 which forms the activating carriage 88 being transferred into its extended position by means of the electric motor 28 and the brake lining 96 thus being applied to the brake rotor 100. The brake lining 102 is thus applied to the brake rotor 100 by virtue of the reaction forces acting inside the actuator assembly 10.

The locking assembly 106 is then transferred into the locking state by means of the locking actuator 112 (see FIG. 7).

Up to the point at which the locking tooth 124 actually engages in the toothing of the output gear wheel 40 and rotation of the output shaft 38 is thus blocked, the spindle nut 88 which forms the activating carriage 88 is held actively in the extended position by means of the electric motor 28, i.e. the electric motor 28 is correspondingly supplied with current.

The delivery of current to the electric motor 28 is interrupted only if the locking tooth 124 engages securely in the locking contour formed by the toothing of the output gear wheel 40.

There are several alternatives for deactivating the parking brake mode.

In a preferred alternative, to do this the electric motor 28 is activated in a direction in which it stresses the spindle nut 88 which forms the activating carriage 88 into the extended position, i.e. shifts it in the direction of the brake lining 96.

In this way, the force on the locking lever 114 is relaxed.

The locking lever 114 can thus be easily transferred from the locking position into the release position by means of the locking actuator 112 (see FIGS. 7 and 8).

Supply of current to the electric motor 28 can then be stopped such that the spindle nut 88 moves back automatically into the retracted position owing to the lack of any self-locking effect.

It is alternatively conceivable that the locking lever 114 is transferred into the release position not by activation of the locking actuator 112 but by the electric motor 28 being activated in a direction corresponding to the extended position of the spindle nut 88 in such a way that the locking lever 114 is forced into its release position by means of the electric motor 28.

The electric motor 28 can then be operated in a direction associated with the retracted position of the spindle nut 88 such that the parking brake mode is deactivated.

It is of course also conceivable to deactivate the parking brake mode only by activating the locking lever 114 by means of the locking actuator 112. In this alternative, the electric motor 28 is not used to deactivate the parking brake mode. It may therefore not be necessary to shift the locking lever 114 under load.

The actuator assembly 10 can be produced as follows.

First, the housing base part 18 is supplied.

Then, the already premounted drive assembly 14 is inserted into the housing base part 18.

As already explained, the drive assembly 14 comprises the carrier assembly 22 on which are mounted the electric motor 28, the spindle drive 72 and the gear unit 67 coupling the electric motor 28 and the spindle drive 72 drivingly 22 and which comprises the gear train 58 and the planetary gear stage 48.

The control assembly 12 is then inserted into the housing base part 18.

As already explained, the control assembly 12 comprises the bulkhead wall 134 and the printed circuit board 138.

The electric motor 28 is additionally connected electrically to the printed circuit board via the second electrical line 162 by the insertion of the control assembly 12 into the housing base part 18.

The plug connector half 152 is moreover connected electrically to the printed circuit board 138 via the first electrical line 154.

The locking actuator 112 is also connected to the printed circuit board 138 via the third electrical line 170 when the control assembly 12 is inserted.

The electrical connections are here in each case created by the electrical lines 154, 162, 170 being plugged into the respective associated contact openings 156, 164, 172 to form a press contact.

Lastly, the housing base part 18 is closed by the housing cover 20 being placed on top.

The invention claimed is:

1. An actuator assembly (10) for a vehicle brake, the actuator assembly (10) comprising:
   a carrier assembly (22) on which an activating carriage (88) for a brake lining (96) is guided linearly,
   an electric motor (28) fastened to the carrier assembly (22) and which is coupled drivingly to the activating carriage (88) via a gear unit (67) and a spindle drive (72) such that the activating carriage (88) can be displaced selectively between a retracted position and an extended position, and
   a locking assembly (106) for selectively immobilizing in rotation an output shaft (38) of the electric motor (28), wherein the locking assembly (106) comprises a locking lever (114) which at a first end (116) is mounted rotatably on the carrier assembly (22) and at a second opposite end (118) is coupled to a locking actuator (112), wherein a locking tooth (124), which can be selectively brought into engagement with a locking contour provided on the output shaft (38), is positioned in the direction in which the locking lever (114) extends longitudinally between the first end (116) and the second end (118),
   wherein a supporting contour (129) for supporting a force component acting radially towards the rotatable mounting of the locking lever (114) is provided between the first end (116) and the second end (118) in the direction in which the locking lever (114) extends longitudinally, wherein the supporting contour (129) interacts with a bearing contour (132) provided on the carrier assembly (22).

2. The actuator assembly (10) according to claim 1, wherein the locking contour is formed by a toothing of an output gear wheel (40) coupled fixedly to the output shaft (38).

3. The actuator assembly (10) according to claim 1, wherein the gear unit (67), the spindle drive (72) and associated drive couplings are configured so that they are not self-locking.

4. The actuator assembly (10) according to claim 1, wherein an axis of rotation of the output shaft (38) is arranged essentially parallel to a centre axis of the spindle drive (72).

5. The actuator assembly (10) according to claim 1, wherein the first end (116) of the locking lever (114) is fork-shaped and receives a bearing bolt (108) fastened to the carrier assembly (22) in order to rotatably mount the locking lever (114).

6. The actuator assembly (10) according to claim 1, wherein the locking actuator (112) comprises a solenoid.

7. The actuator assembly (10) according to claim 1, wherein the locking actuator (112) is bistable.

8. The actuator assembly (10) according to claim 1, wherein the supporting contour (129) and/or the bearing contour (132) comprises or comprise a cylindrical surface portion of a circular cylinder, a centre axis of which coincides with an axis of rotation associated with the rotatable mounting of the locking lever (114).

9. The actuator assembly (10) according to claim 1, wherein the supporting contour (129) is formed on a flank (128) of a supporting projection (126).

10. The actuator assembly (10) according to claim 1, wherein the bearing contour (132) is formed on an arc-shaped wall section (130) of the carrier assembly (22).

11. The actuator assembly according to claim 1, wherein the supporting contour (129) slides along the bearing contour (132) for generating the force component acting radially towards a bearing about which the first end (116) is rotatable.

12. An actuator assembly (10) for a vehicle brake, the actuator assembly (10) comprising:
   a carrier assembly (22) on which an activating carriage (88) for a brake lining (96) is guided linearly,
   an electric motor (28) fastened to the carrier assembly (22) and which is coupled drivingly to the activating carriage (88) via a gear unit (67) and a spindle drive (72) such that the activating carriage (88) can be displaced selectively between a retracted position and an extended position, and
   a locking assembly (106) for selectively immobilizing in rotation an output shaft (38) of the electric motor (28), wherein the locking assembly (106) comprises a locking lever (114) which at a first end (116) is mounted rotatably on the carrier assembly (22) and at a second opposite end (118) is coupled to a locking actuator (112),
   wherein a locking tooth (124), which can be selectively brought into engagement with a locking contour provided on the output shaft (38), is positioned in the direction in which the locking lever (114) extends longitudinally between the first end (116) and the second end (118),
   wherein the locking lever (114) has two sections (114*a*, 114*b*) in the direction in which it extends longitudinally, the sections (114*a*, 114*b*) extending in opposite directions from the locking tooth (124) and being offset relative to each other in a direction which corresponds to the direction in which the output shaft (38) extends longitudinally.

13. The actuator assembly according to claim 12, wherein the sections (114*a*, 114*b*) reside in different planes from one another so as to be offset relative to one another.

* * * * *